(12) United States Patent
Becker et al.

(10) Patent No.: US 9,380,772 B2
(45) Date of Patent: Jul. 5, 2016

(54) SUSPENSION SYSTEMS FOR FLEXIBLE FRAME VEHICLES

(71) Applicants: AGCO Corporation, Hesston, KS (US);
Tony Becker, Jackson, MN (US);
Nathan Low, Windom, MN (US)

(72) Inventors: Tony Becker, Jackson, MN (US);
Nathan Low, Windom, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/432,420

(22) PCT Filed: Sep. 27, 2013

(86) PCT No.: PCT/US2013/062121
§ 371 (c)(1),
(2) Date: Mar. 30, 2015

(87) PCT Pub. No.: WO2014/052723
PCT Pub. Date: Apr. 3, 2014

(65) Prior Publication Data
US 2015/0237845 A1 Aug. 27, 2015

Related U.S. Application Data

(60) Provisional application No. 61/707,371, filed on Sep. 28, 2012.

(51) Int. Cl.
*B60G 7/02* (2006.01)
*A01M 7/00* (2006.01)
*B60G 21/055* (2006.01)
*B60G 9/02* (2006.01)

(52) U.S. Cl.
CPC ............ *A01M 7/0082* (2013.01); *A01M 7/0042* (2013.01); *B60G 7/02* (2013.01); *B60G 9/02* (2013.01); *B60G 21/0551* (2013.01); *B60G 2200/314* (2013.01); *B60G 2200/318* (2013.01); *B60G 2202/152* (2013.01); *B60G 2204/1434* (2013.01); *B60G 2206/601* (2013.01)

(58) Field of Classification Search
CPC ............ A01M 7/0082; A01M 7/0042; B60G 21/0551; B60G 7/02; B60G 9/02; B60G 2204/1434; B60G 2206/601; B60G 2202/152; B60G 2200/318; B60G 2200/314
See application file for complete search history.

(56) References Cited

U.S. PATENT DOCUMENTS

| 4,773,670 A | * | 9/1988 | Raidel, II | ............... | B60G 9/003 280/124.162 |
| 4,802,690 A | * | 2/1989 | Raidel | ................... | B60G 11/27 280/124.157 |
| 5,538,264 A | | 7/1996 | Brown et al. | | |
| 5,549,320 A | | 8/1996 | Ellingsen | | |
| 6,135,470 A | | 10/2000 | Dudding | | |

(Continued)

OTHER PUBLICATIONS

International Searching Authority, International Search Report for International Patent Application No. PCT/2013/062121, mailing date of Mar. 21, 2014.

*Primary Examiner* — Drew Brown

(57) ABSTRACT

A flexible frame for a high clearance agricultural vehicle has left and right frame rails, an axle suspended beneath the frame rails, and a suspension system coupling the axle to the frame rails. Left and right vertical mounts are coupled to the frame rails. Upper and lower torque rods couple the axle to the vertical mounts with brackets. The suspension system also has a cross torque rod having a left end coupled to an inward facing bracket on the left vertical mount and a right end coupled to an inward facing bracket on the right vertical mount. Each of the upper, lower and cross torque rods are coupled to its respective torque rod brackets with rotatable joints. The rotatable joint permits angular rotation of the torque rod about its torque rod bracket.

8 Claims, 4 Drawing Sheets

(56) References Cited

U.S. PATENT DOCUMENTS

| | | | |
|---|---|---|---|
| 7,188,850 B2 * | 3/2007 | Ziech | B60G 9/00 280/124.125 |
| 7,195,272 B2 * | 3/2007 | Larson | B62D 7/142 267/52 |
| 7,303,200 B2 * | 12/2007 | Ramsey | B62D 21/02 280/124.109 |
| 8,544,864 B2 * | 10/2013 | Molitor | B60G 7/001 280/124.106 |
| 9,085,212 B2 * | 7/2015 | Dudding | B60G 9/02 |
| 2010/0276903 A1 | 11/2010 | Winter | |

* cited by examiner

SUSPENSION SYSTEMS FOR FLEXIBLE FRAME VEHICLES

CROSS REFERENCE TO RELATED APPLICATIONS

This application claims priority to U.S. Provisional Application No. 61/707,371 filed Sep. 28, 2012, entitled "SUSPENSION SYSTEM FOR A FLEXIBLE FRAME VEHICLE".

BACKGROUND OF THE INVENTION

1. Field of Invention

This invention relates generally to vehicle suspensions, and more particularly to a suspension for a flexible frame vehicle.

2. Description of Related Art

The high crop yields of modern agribusiness require application of fertilizers, pesticides, and herbicides. Dispersing these chemicals onto high acreage fields requires specialized machines mounted on or towed by a vehicle. An example of such a machine is the self-propelled crop sprayer. A common design for a self-propelled crop sprayer includes a dedicated chassis with a tank, boom arms, and nozzles connected to the boom arms. The tank contains fluid such as fertilizers, pesticides, and herbicides. Boom arms extend outward from the sides of the dedicated chassis. Boom plumbing contains supply lines and a plurality of nozzles spaced apart along the length of the boom arms at a standard spacing distance which corresponds to the spray pattern of the nozzles. In operation, as the crop sprayer crosses the field, fluid is pumped from the tank through the supply lines along the boom arms, and out through the nozzles. This allows the self-propelled sprayer to distribute the fluid along a relatively wide path. The length of conventional boom arms may vary from, for example, 6 meters (18 feet) up to 46 meters (150 feet), but smaller or longer booms are possible. The boom arms typically swing in for transport and out for operation.

Desirably, crop sprayers have a flexible suspension arrangement that permits the vehicle to traverse uneven terrain encountered in the field. One known self-propelled sprayer is provided with a suspension arrangement having each of four drive wheels of the sprayer suspended independently, one each at opposite ends of front and rear axles that are fixed to the main frame of the sprayer. The suspension for each of the wheels includes a large complicated, machined casting fixed to one end of an associated axle and which works together with spindles which telescope within upright sleeves defined by the casting so as to permit relative motion between the wheel and the axle. Another sprayer design has axles suspended from beams of the sprayer frame. The beams are fixed relative to each other by cast cross members. However, deflection of the frame concentrates stresses in the cross members and limits flexibility of the frame causing poor tire-to-ground contact in extreme terrain.

Accordingly, the problem to be solved is that of providing a wheel suspension for a self-propelled sprayer which overcomes the drawbacks associated with the prior art suspensions.

OVERVIEW OF THE INVENTION

In one embodiment, the invention relates to a flexible frame for a high clearance agricultural vehicle. The frame has left and right fore-and-aft extending parallel frame rails, an axle suspended beneath the frame rails, and a suspension system coupling the axle to the frame rails. The suspension system includes a left vertical mount coupled to the left frame rail at a position forward of a rear end of the left frame rail and a right vertical mount coupled to the right frame rail at a position forward of a rear end of the right frame rail. Each of the left and right vertical mounts has a rearward facing upper rod bracket, a rearward facing lower rod bracket, and an inward facing cross rod bracket. The suspension system also includes an upper pair of right and left torque rods, each of the upper pair of torque rods having a forward end coupled to its respective upper rod bracket, and a rear end coupled to a forwardly facing upper bracket on the axle and a lower pair of right and left torque rods, each of the lower pair of torque rods having a forward end coupled to its respective lower rod bracket, and a rear end coupled to a forwardly facing lower bracket on the axle. The suspension system also has a cross torque rod having a left end coupled to the inward facing bracket on the left vertical mount and a right end coupled to the inward facing bracket on the right vertical mount. Each of the upper, lower and cross torque rods are coupled to its respective torque rod brackets with rotatable joints. The rotatable joint includes a pin and ball bearings that permits angular rotation of the torque rod about its torque rod bracket.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
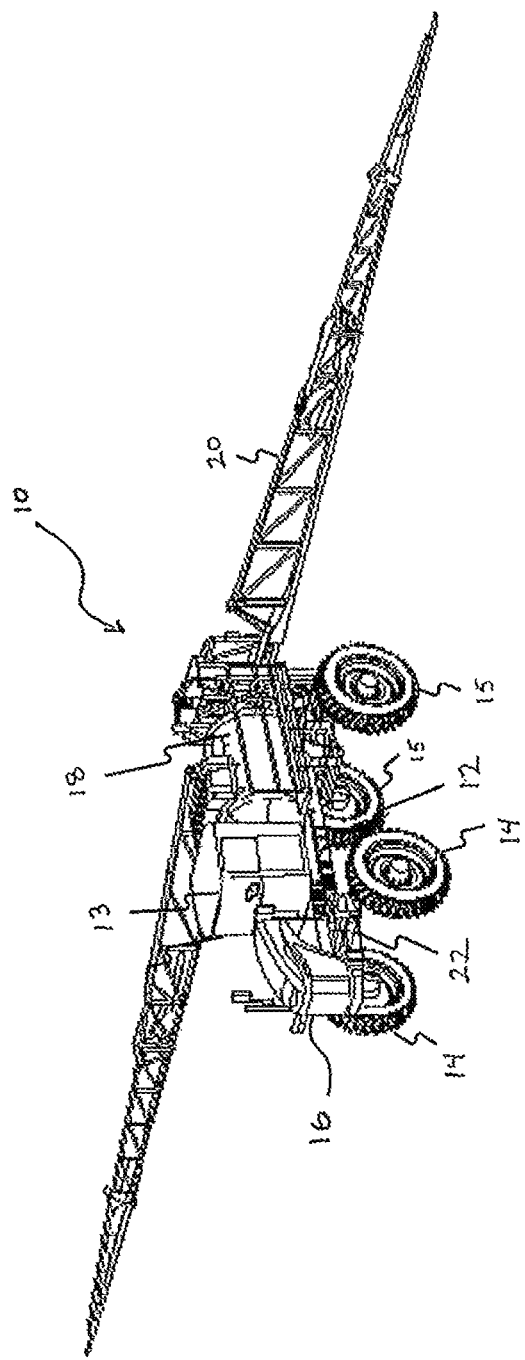
FIG. 1 is a perspective view of a crop sprayer vehicle.

FIG. 1 shows a high clearance agricultural vehicle, such as a self-propelled agricultural crop sprayer used to deliver chemicals to agricultural crops. Crop sprayer 10 includes a chassis 12 and a cab 13 mounted on the chassis 12. In one embodiment, the chassis 12 is supported on a front pair of driven, steerable ground wheels 14 and a rear pair of driven, non-steerable ground wheels 15. Cab 13 may houses an operator and a number of controls for the crop sprayer 10. An engine 16 may be mounted on a forward portion of chassis 12 in front of cab 13 or may be mounted on a rearward portion of the chassis 12 behind the cab 13. The engine 16 may be commercially available from a variety of sources and may comprise, for example, a diesel engine or a gasoline powered internal combustion engine. The engine 16 provides energy to propel crop sprayer 10 and also may provide energy used to spray fluids from the crop sprayer 10.

The crop sprayer 10 further includes a storage tank 18 used to store a fluid to be sprayed on the field. The fluid may include chemicals, such as but not limited to, herbicides, pesticides, and/or fertilizers. Storage tank 18 may be mounted on chassis 12, either in front of or behind cab 13. Boom arms 20 extending from each side of the crop sprayer 10 are used to distribute the fluid from the tank 18 over a wide swath as the crop sprayer 10 is driven through the field. While the invention is described herein with respect to a crop sprayer 10, one skilled in the art will understand that the invention is also applicable to any high-clearance vehicles where a flexible frame would be desirable.

Figure 2:
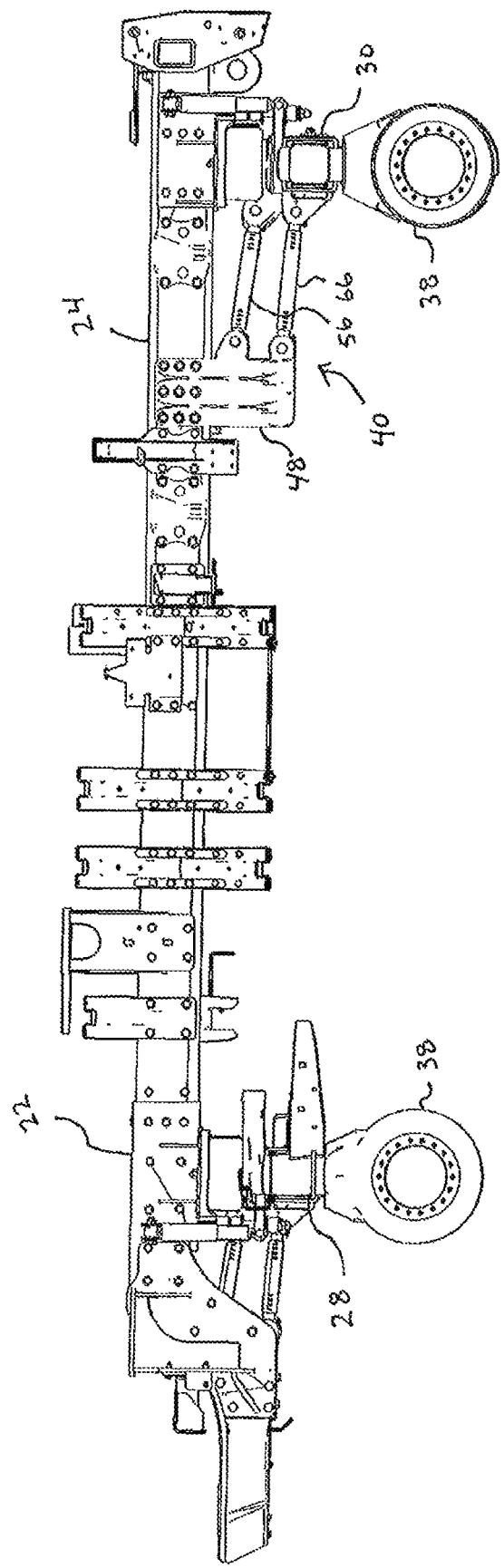
FIG. 2 is a side view of the frame of the crop sprayer vehicle of FIG. 1 with its rear axle being suspended in accordance with the principles of the present invention.
Figure 3:
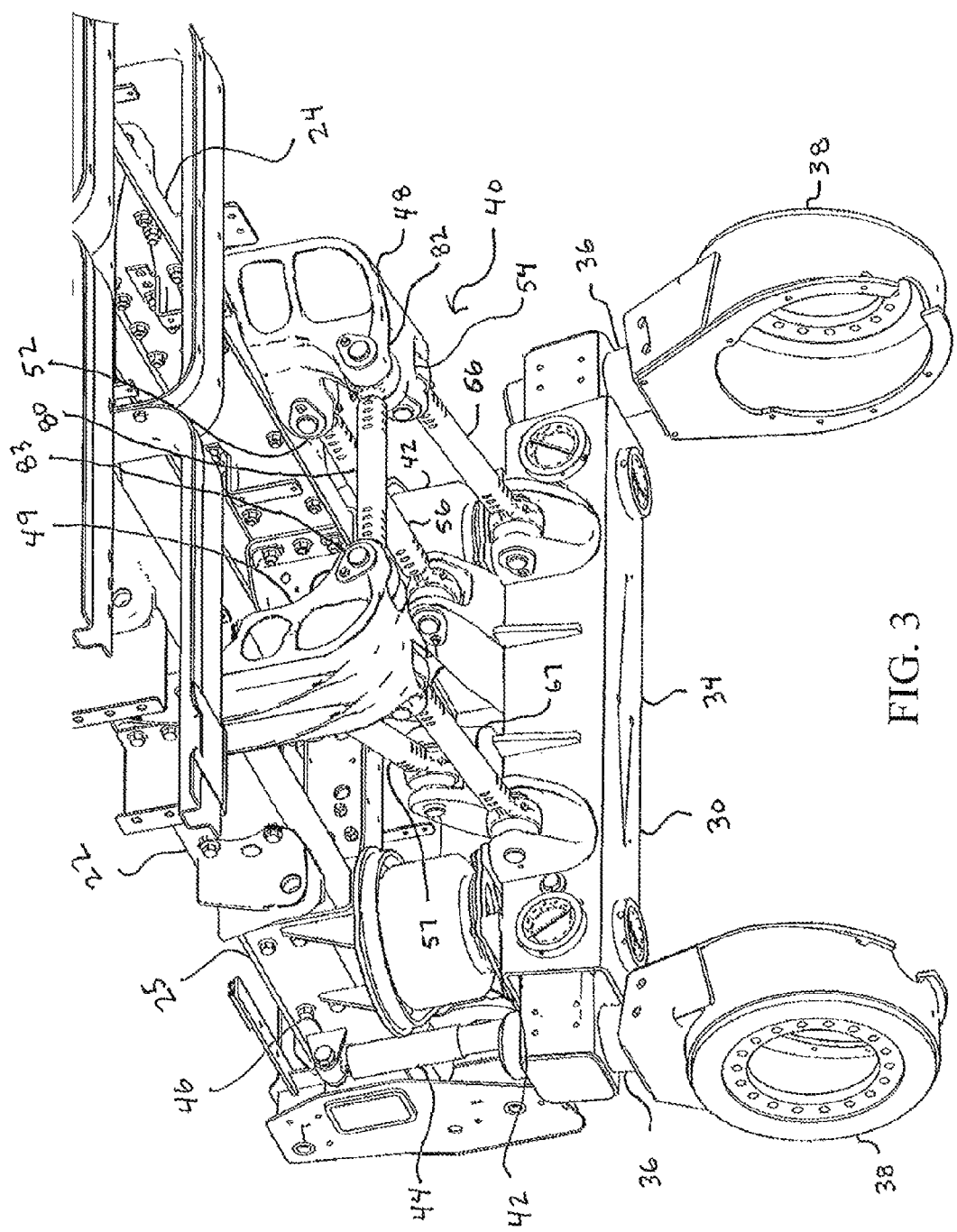
FIG. 3 an enlarged perspective view of the rear region of the vehicle frame and axle suspension shown in FIG. 2.

Referring now to FIGS. 2 and 3, the chassis 12 has a flexible main frame 22 that comprises transversely spaced, right- and left-hand, fore-and-aft extending parallel frame rails 24, 25. Suspended beneath each of front and rear end regions of, and disposed crosswise relative to, the frame rails 24, 25 are front and rear axles 28, 30, respectively. As best seen in FIG. 3, the rear axle 30 includes a main central section 34 defined by a tube having a substantially square cross section. Right and left spindle housings 36 extend from opposite ends of the central section 34. Right and left hand spindles (not visible) are respectively mounted for oscillating in the spindle housings 36. Formed integrally with a bottom end of the spindles are right and left wheel support and motor housings 38. A hydraulic drive motor (not shown) may be bolted to each of the wheel support and motor housings 38, and is coupled for driving an associated one of the wheels 13.

A suspension system 40 couples the axle 30 to the frame rails 24, 25. As is known in the art, up and down motion of the rear axles 30 is cushioned by airbags 42. Further cushioning of up and down movement of the axle 30 is provided by shock absorbers 44 having respective upper ends coupled to right and left upper mounts 46, respectively fixed to and projecting outwardly from the frame rails 24, 25.

According to the invention, left and right vertical mounts 48, 49 are coupled to and extend downward from the frame rails 24, 25. The vertical mounts 48, 49 are spaced forwardly from rear ends of the frame rails 24, 25 and have an upper face 50 engaged with, and secured against, outer faces of the frame rails 24, 25. In the illustrated embodiment, the vertical mounts 48, 49 are secured to the frame rails 24, 25 with bolts 51 and not welded to increase flexibility of the frame 22. The left and right vertical mounts 48, 49 have rearward facing upper rod brackets 52, 53 and a rearward facing lower rod brackets 54, 55. A pair of upper torque rods 56, 57 are coupled between the vertical mounts and the axle 30. In the illustrated embodiment, left and right upper torque rods 56, 57 each have forward ends respectively coupled to the upper pair of rod brackets 52, 53, and have rearward ends respectively coupled to and upper pair of forwardly facing upper brackets 58, 59 on the central section 34 of the axle 30. Similarly, a lower pair of right and left torque rods 66, 67 have forward ends respectively coupled to the lower right and left rod brackets 54, 55, and have rearward ends respectively coupled to right and left forwardly facing lower rod brackets 68, 69 on the central section 34 of the axle 30. Desirably, the upper and lower torque rods 56, 57, 66 and 67 are identical to each other, this being made possible by the arrangement of the various described torque rod brackets 52, 53, 54, 55, 58, 59, 68 and 69.

Figure 4:
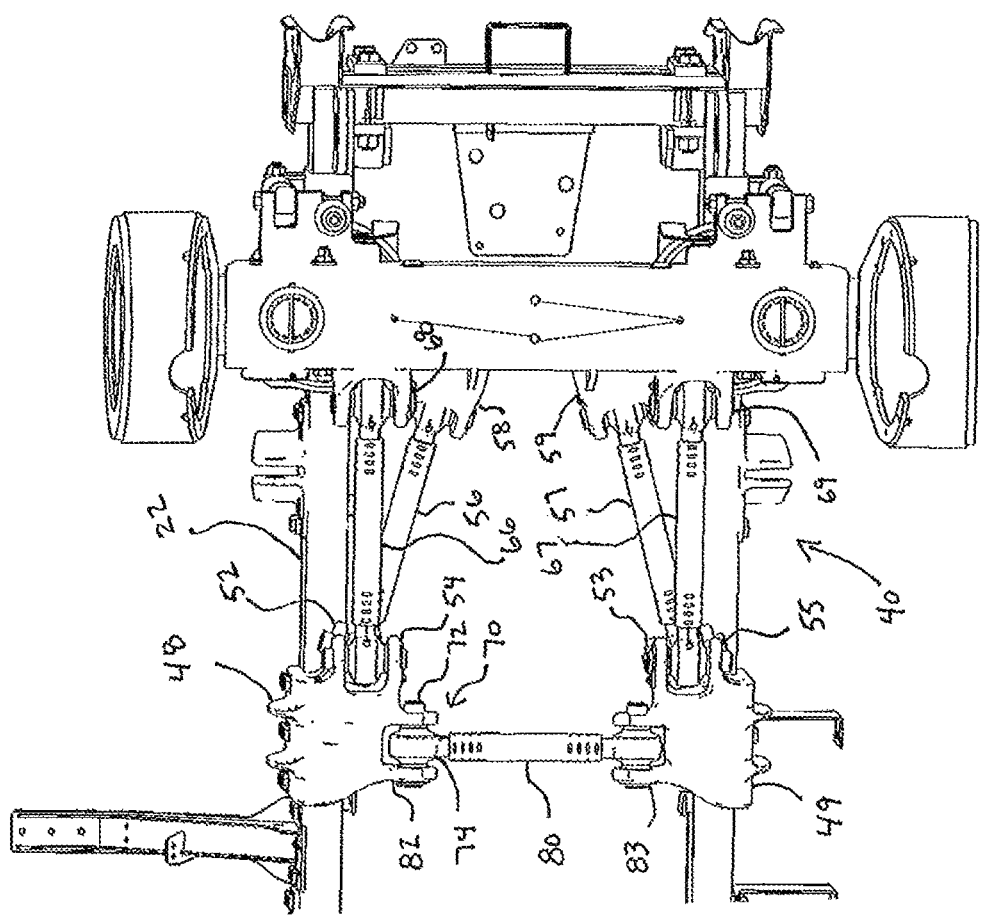
FIG. 4 is an enlarged bottom view of a rear region of the vehicle frame and axle suspension.

The upper and lower torque rods 56, 57, 66 and 67 limit fore-to-aft and side-to-side movement of the axle 30. In order to constrain sideways motion of the axle 30 and wheels 13 as they travel up and down, the lower torque rods 66, 67 are angled inward and skew with the upper set of torque rods 56, 57, as viewed from the bottom in FIG. 4. As viewed from the side in FIG. 2, the upper pair of torque rods 56, 57 is offset vertically from the lower pair of torque rods 66, 67. Thus, the axle 30 and attached wheels 13 move substantially vertically during travel over uneven ground. The upper and lower torque rods 56, 57, 66 and 67 are mounted on the torque rod brackets 52, 53, 54, 55, 58, 59, 68 and 69 using a stress-relieving rotatable joint 70. In one embodiment, the joint 70 comprises a pin 72 and a ball bearing 74 that permits limited angular rotation of the torque rod about its torque rod bracket. Desirably, the joint 70 permits between about 5 and 20 degrees of rotation, and more desirably about 12 degrees of rotation of the torque rod with respect to its torque rod bracket.

The spacing between the left and right vertical mounts 48, 49 is fixed by a cross torque rod 80. Left end of the cross torque rod 80 is coupled to an inward facing bracket 82 on the left vertical mount 48 and right end of the cross torque rod 80 is coupled to an inward facing bracket 83 on the right vertical mount 49. Cross torque rod 80 is coupled to the inward facing brackets 82, 83 with rotatable joints 70 as described above. Coupling the cross torque rod 80 to the vertical mounts 48, 49 with rotatable joints 70 reduces stresses in the vertical mounts 48, 49 and allows deflection between the frame rails 24, 25 while permitting full tire-to-ground contact in uneven terrain.

While two pair of upper and lower torque rods 56, 57, 66, 67 are used for the axle 30, it is noted that for some applications a single pair might provide an adequate axle suspension.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A flexible frame for a high clearance agricultural vehicle, the frame having left and right fore-and-aft extending parallel frame rails, an axle suspended beneath the frame rails, and a suspension system coupling the axle to the frame rails, the suspension system comprising:
   a left vertical mount coupled to said left frame rail at a position forward of a rear end of said left frame rail and a right vertical mount coupled to said right frame rail at a position forward of a rear end of said right frame rail, wherein each of said left and right vertical mounts has a rearward facing upper rod bracket, a rearward facing lower rod bracket, and an inward facing cross rod bracket;
   left and right upper torque rods, each of said upper torque rods having a forward end coupled to respective left or right upper rod bracket, and a rear end coupled to a forwardly facing upper bracket on the axle;
   left and right lower torque rods, each of said lower torque rods having a forward end coupled to respective left or right lower rod bracket, and a rear end coupled to a forwardly facing lower bracket on the axle; and
   a cross torque rod having a left end coupled to said inward facing bracket on the left vertical mount and a right end coupled to said inward facing bracket on the right vertical mount;

wherein each of the upper, lower and cross torque rods are coupled to their respective torque rod brackets with a rotatable joint, said joint comprising a pin permitting angular rotation of the torque rod about its torque rod bracket.

2. The flexible frame of claim 1 wherein each of the left and right vertical mounts have an upper face engaged with, and secured against, outer faces of the frame rails.

3. The flexible frame of claim 2 wherein the vertical mounts are secured to the frame rails with bolts.

4. The flexible frame of claim 1 wherein the joint permits between 5 and 20 degrees of rotation.

5. The flexible frame of claim 1 wherein the joint permits about 12 degrees of rotation.

6. The flexible frame of claim 1 wherein up and down motion of the axle is cushioned by airbags.

7. The flexible frame of claim 1 wherein said lower torque rods are offset vertically from said upper torque rods, and wherein the torque rods of either said pair of left and right upper torque rods or said pair of left and right lower torque rods are angled inward and skew with the torque rods of the other pair of torque rods, and wherein the cross torque rod is perpendicular with the torque rods of said other pair of torque rods.

8. The flexible frame of claim 1 wherein the rotatable joints comprise a pin and ball bearings that permits angular rotation of the torque rod about its torque rod bracket.

* * * * *